United States Patent
Haddad

(10) Patent No.: US 6,941,962 B2
(45) Date of Patent: Sep. 13, 2005

(54) CONVERTIBLE CONTROL DEVICE CAPABLE OF REGULATING FLUID PRESSURE FOR MULTIPLE FLUID TYPES AND ASSOCIATED METHOD OF USE

(75) Inventor: Nabil Mikhael Haddad, Garden Grove, CA (US)

(73) Assignee: Robertshaw Controls Company, Richmond, VA (US)

( * ) Notice: Subject to any disclaimer, the term of this patent is extended or adjusted under 35 U.S.C. 154(b) by 277 days.

(21) Appl. No.: 10/449,613

(22) Filed: May 30, 2003

(65) Prior Publication Data

US 2004/0238029 A1 Dec. 2, 2004

(51) Int. Cl.$^7$ ............................................. G05D 16/06
(52) U.S. Cl. ........................ 137/1; 137/269; 137/510; 251/337
(58) Field of Search ............................. 137/269, 270, 137/509, 510, 1; 251/337

(56) References Cited

U.S. PATENT DOCUMENTS

| | | | | |
|---|---|---|---|---|
| 3,451,421 A | * | 6/1969 | Vicenzi et al. ............... | 137/495 |
| 3,747,629 A | * | 7/1973 | Bauman ...................... | 137/270 |
| 3,867,956 A | * | 2/1975 | Ibragimov et al. .......... | 137/269 |
| 4,053,136 A | | 10/1977 | Perl | |
| 4,111,637 A | | 9/1978 | Hillman, II | |
| 5,379,794 A | | 1/1995 | Brown | |
| 5,407,128 A | | 4/1995 | Schultz | |
| 5,413,141 A | | 5/1995 | Dietiker | |
| 5,435,343 A | | 7/1995 | Buezis | |
| 5,674,065 A | | 10/1997 | Grando et al. | |
| 5,806,412 A | | 9/1998 | Bedford et al. | |
| 5,979,484 A | | 11/1999 | Grando et al. | |
| 5,988,204 A | * | 11/1999 | Reinhardt et al. .......... | 137/271 |
| 6,003,544 A | | 12/1999 | Turrin et al. | |
| 6,082,388 A | | 7/2000 | Turrin et al. | |
| 6,095,223 A | | 8/2000 | Rossini et al. | |
| 6,164,959 A | | 12/2000 | Previato et al. | |
| 6,170,507 B1 | | 1/2001 | Dalton et al. | |
| 6,182,944 B1 | | 2/2001 | Veronese et al. | |

FOREIGN PATENT DOCUMENTS

| | | |
|---|---|---|
| EP | 0989366 A1 | 3/2000 |
| EP | 1039225 A2 | 9/2000 |
| EP | 1058060 A1 | 12/2000 |
| EP | 1106923 A2 | 6/2001 |

OTHER PUBLICATIONS

Honeywell, VS8420 Millivolt Gas Valve Installation Instructions, 2000.

* cited by examiner

Primary Examiner—Kevin Lee
(74) Attorney, Agent, or Firm—Blackwell Sanders Peper Martin LLP

(57) ABSTRACT

A pressure control device and associated method of use capable of regulating fluid pressure for multiple fluid types. The pressure control device includes a fluid sensing port, a pressure responsive device, a fluid sensing port, a valve, a valve seat, a first valve chamber, a second valve chamber that is moveable in relationship to the first valve chamber, a first member located within the first valve chamber, a first biasing mechanism located between the pressure responsive device and the first member, a first adjustment mechanism adjustably attached to the first valve chamber for selectively positioning the first member in relation to the first valve chamber, a second member located within the second valve chamber, a second biasing mechanism to apply pressure to the second member and a second adjustment mechanism adjustably attached to the second valve chamber for selectively positioning the second member in relation to the second valve chamber.

28 Claims, 10 Drawing Sheets

CONVERTIBLE CONTROL DEVICE CAPABLE OF REGULATING FLUID PRESSURE FOR MULTIPLE FLUID TYPES AND ASSOCIATED METHOD OF USE

BACKGROUND OF THE INVENTION

In the past, there has been a desire to utilize more, than one type of fluid that is utilized as fuel for virtually any type of gas-powered devices including, but not limited to, furnaces, heaters, fireplaces, engines, and so forth.

Typically, most gas-powered devices require some type of regulation of the gas pressure. Two types of common fluids used as fuels include liquefied petroleum, e.g., liquid propane, and natural gas. There are major differences between these two fuels since they are supplied to the gas-powered devices at different pressures and they have different burning characteristics. For example, in a furnace or burner application, the typical pressure value for natural gas is 3.5 inches $H_2O$ while the typical pressure value for liquefied petroleum is 10.0 inches $H_2O$. Therefore, a pressure regulator for a gas-powered device must regulate to a lower pressure for natural gas than for higher pressure than for liquefied petroleum.

Unfortunately, it is not always known what type of fuel will be available. In some situations, one type is available initially and then another type of fuel is available later. Also, there are situations when both are available but one is much less costly.

There are various situations in which it is not known at the outset, which type of fuel gas will be used, and/or in which the type of fuel gas may be changed at some point during the operating life of the device such as a furnace or other appliance. Either situation often occurs with a gas fireplace. Another common situation is in connection with new construction of permanent fixed location dwellings. Initially, natural gas may not be available because underground gas lines are not in place in the area, or because hook up to natural gas lines is delayed by frozen ground, or for other reasons. What is typically required is to change the entire gas valve to accommodate the new fuel or replace the regulator valve or components thereof to accommodate the change in pressure. This can be a very expensive and time-consuming conversion. Also, some gas-powered devices, e.g., furnaces, hot water heaters, and so forth are built without knowing the preferences of the ultimate consumer. There are also situations where a preferred fuel will be available in the future, but the fuel-powered device needs to be operational today.

The present invention is directed to overcoming one or more of the problems set forth above.

SUMMARY OF INVENTION

This invention relates to the regulation of fluid pressure with a pressure control device that is capable of handling more than one fluid type. The preferred fluid is gas.

In one aspect of this invention, a pressure control device for regulating fluid pressure is disclosed. This pressure control device includes a fluid sensing port, a pressure responsive device adjacent to the fluid sensing port, a valve, a valve seat located between the valve and the pressure responsive device, an outlet that is in fluid communication with an adjustable opening located between the valve and the valve seat, a first valve chamber, a second valve chamber that is moveable in relationship to the first valve chamber along a first axis and in fluid communication therewith, a first member located within the first valve chamber, a first biasing mechanism located between the pressure responsive device and the first member to apply pressure to the pressure responsive device that controls the pressure of fluid from the outlet, a first adjustment mechanism adjustably attached to the first valve chamber for selectively positioning the first member in relation to the first valve chamber, a second member located within the second valve chamber, a second biasing mechanism to apply pressure to the second member and is located within the second valve chamber and a second adjustment mechanism adjustably attached to the second valve chamber for selectively positioning the second member in relation to the second valve chamber.

In another aspect of this invention, a method for regulating fluid pressure with a pressure control device is disclosed. This method includes selectively positioning a first member located within a first valve chamber with a first adjustment mechanism, wherein the first member is adjacent to a first biasing mechanism, selectively positioning the second valve chamber in relationship to a first valve chamber and selectively positioning a second member located within the second valve chamber with a second adjustment mechanism, wherein a second biasing mechanism is located between the second member and the second valve chamber, wherein the first biasing mechanism applies force to a pressure responsive device adjacent to the fluid sensing port to create an adjustable opening between a valve and a valve seat and the adjustable opening is in fluid communication with an outlet.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention. For example, the invention can be applied to virtually any type of gas-powered device that can be powered by natural gas and liquefied petroleum. Therefore, this invention can be applied to virtually any type of gas appliance including, but not limited to, furnaces, heaters, fireplaces, and so forth. In addition, this invention may be applied to an engine. The fuel is preferably, but not necessarily, gas. Illustrative, but nonlimiting examples of the types of gas utilized with the present invention include natural gas, manufactured gas and liquefied petroleum, e.g., liquid propane.

Figure 1:
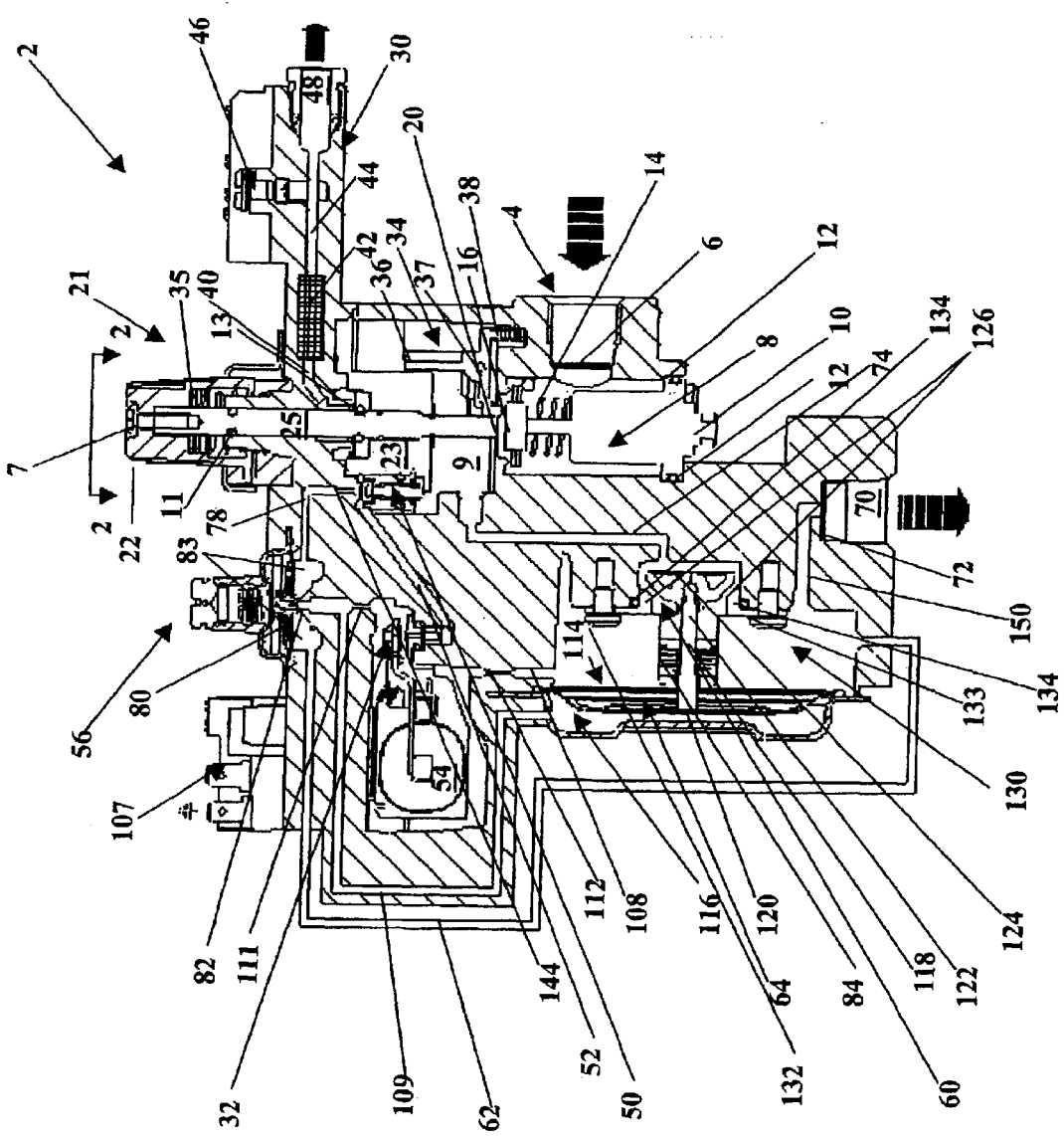
FIG. 1 is a schematic of a main control device for delivering fuel in accordance with the present invention.
Figure 9:
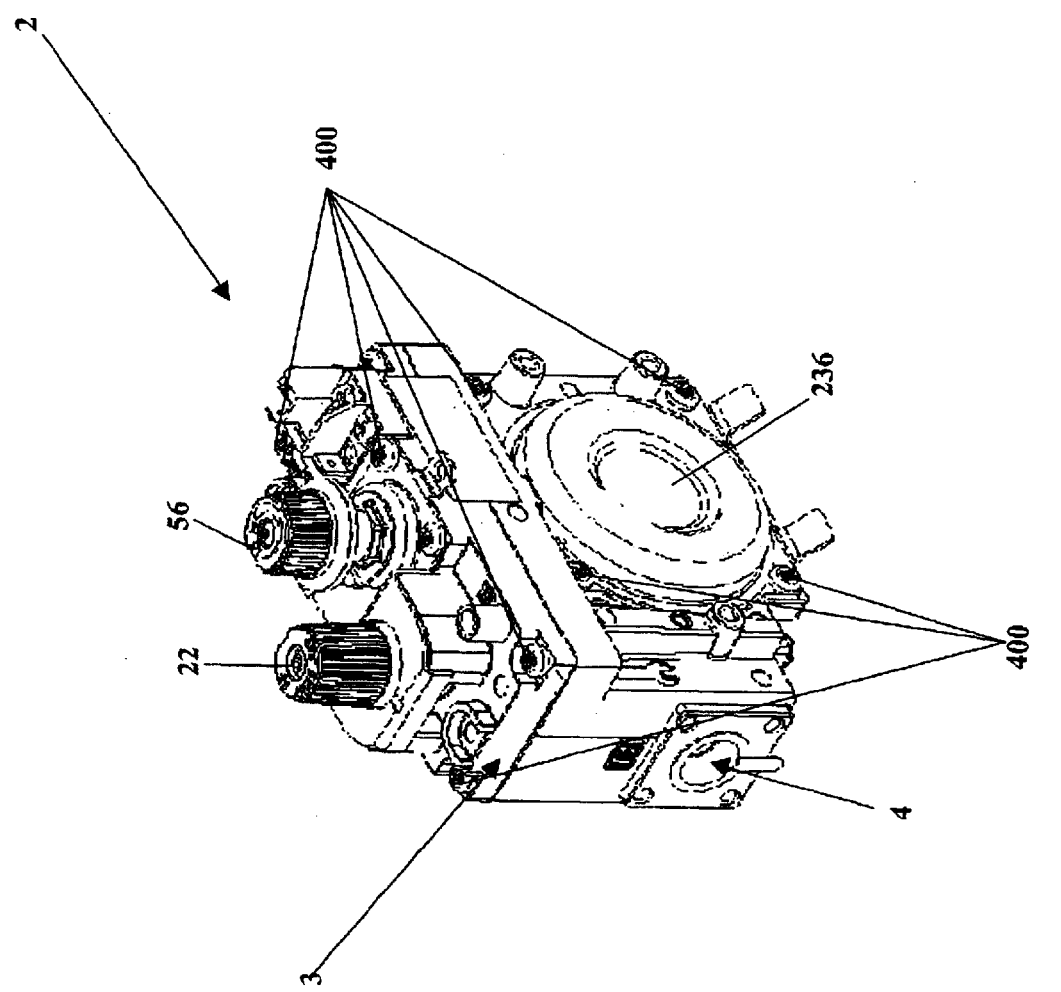
FIG. 9 is a top perspective view of the main control device for delivering fuel in accordance with the present invention.
Figure 10:
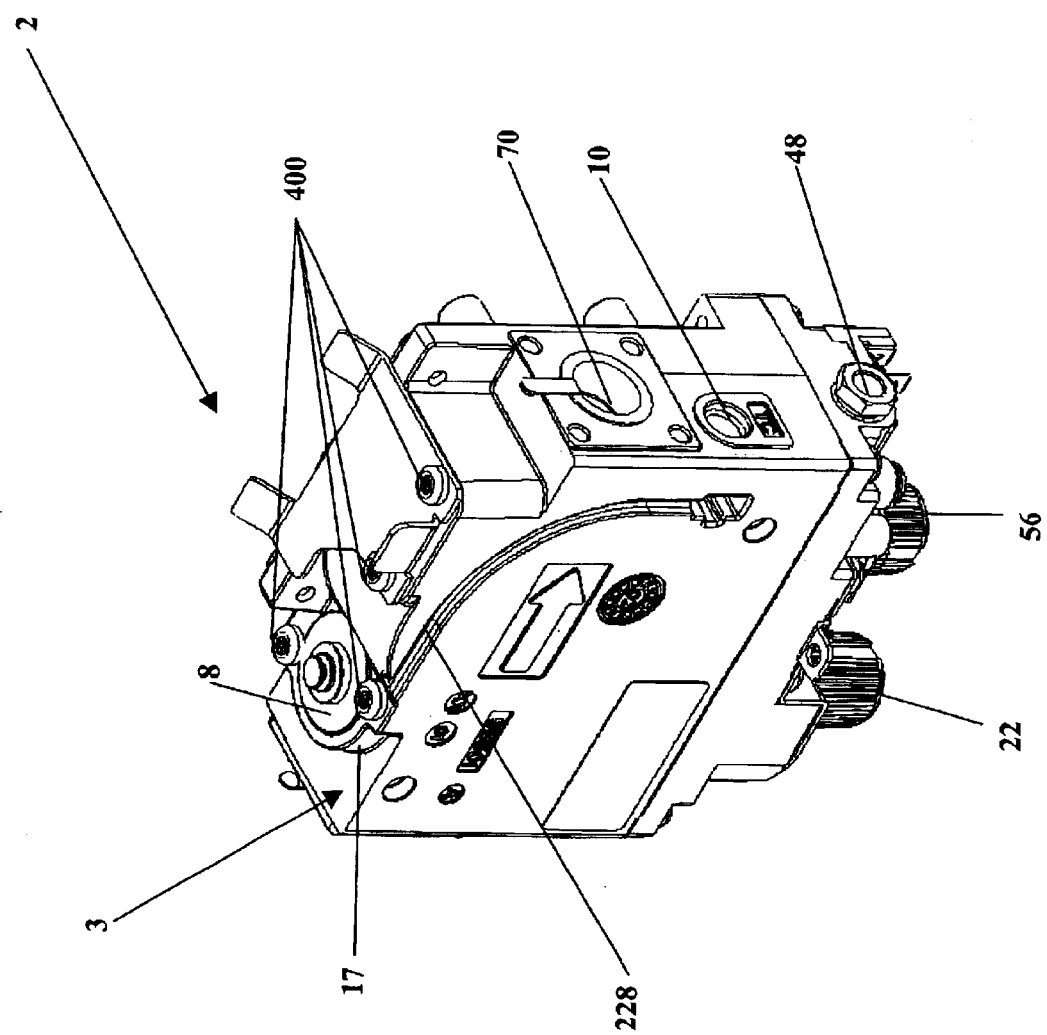
FIG. 10 is a bottom perspective view of the main control device for delivering fuel in accordance with the present invention.

Referring now to the drawings, and initially to FIG. 1, where FIG. 1 is a cross-section of a main control device that is utilized to deliver fuel, e.g., gas, at a regulated rate of pressure, which is generally indicated by numeral 2. The main control device 2 includes a housing 3, as shown in FIGS. 9 and 10. The fuel, e.g., gas, enters the main control device 2 through an inlet port 4 from a fuel supply (not shown). There is a screen 6 that prevents contaminants in the fuel, e.g., gas, from entering the main control device 2 from the inlet port 4.

Figure 3:
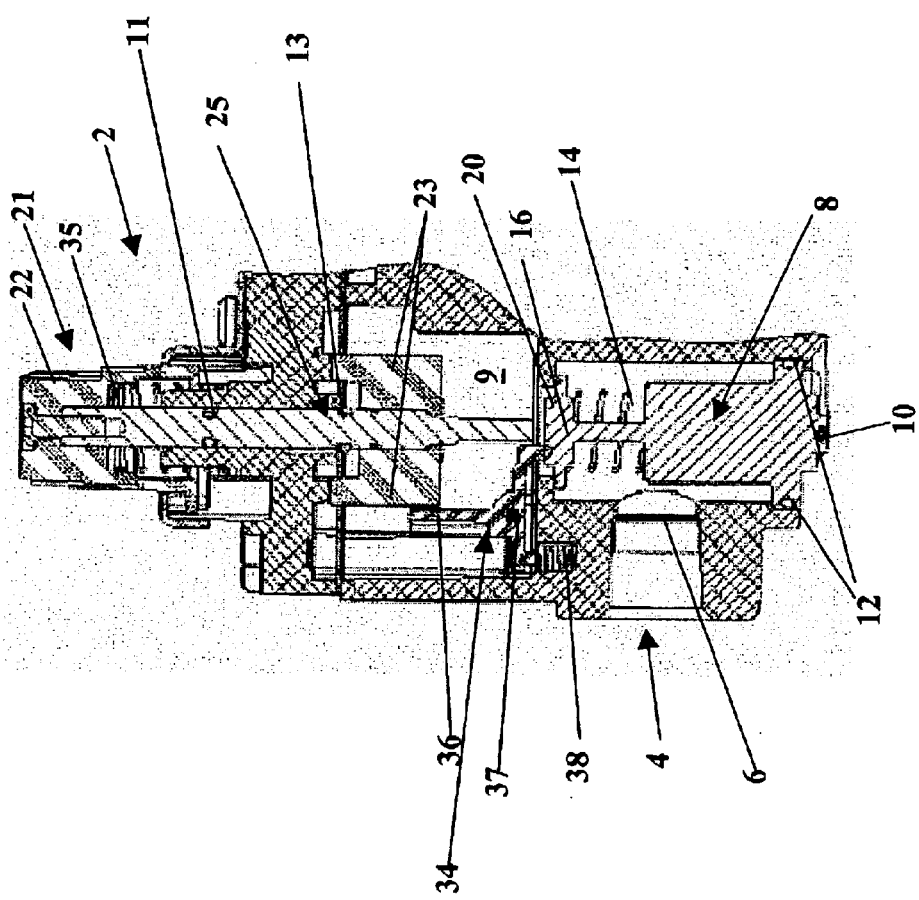
FIG. 3 is a cross-sectional view, taken along line 2—2 in FIG. 1, of a safety valve for the main fuel control device for delivering fuel.

As shown in FIGS. 1 and 3, there is an electromagnetic safety valve 8 that can block the pressure of fuel coming from the inlet port 4. The electromagnetic safety valve 8 is energized by applying a thermocouple or a thermopile to a connection 10 that applies current to a magnetic coil 17, as shown in FIG. 10. When the current is removed from the magnetic coil 17, the return biasing mechanism, e.g., spring, 14 pushes the plunger 16 against an opening 20. The connection 10 is preferably, but not necessarily, a quick-connect type of device that is integrally connected to the electromagnetic safety valve 8. The electromagnetic safety valve 8 can provide what is commonly referred to as a "flame supervision" type of device. An o-ring 12 prevents fluid, e.g., gas, from escaping from the electromagnetic safety valve 8.

Figure 2:
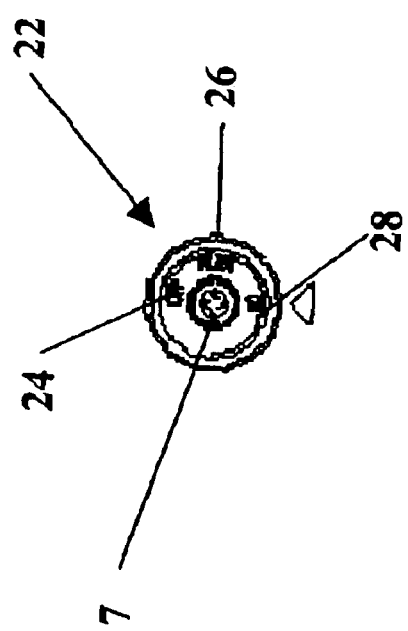
FIG. 2 is an isolated top view of a control on/off pilot knob, as shown in FIG. 1, for the main fuel control device for delivering fuel in accordance with the present invention.

There is a control valve assembly that is generally indicated by numeral 21. As shown in FIG. 2, there is a control valve adjustment knob that is generally indicated by numeral 22 that provides a user interface for operating the control valve assembly 21. There is an "off" position 24, where the control valve assembly 21 closes to prevent fuel, e.g., gas, flow to both a pilot assembly 30 and an actuator valve 32, as shown in FIG. 1. A lack of fuel, e.g., gas, to the pilot assembly 30 will cool-off the thermocouple or the thermopile that was being applied to a thermocouple connection 10 so that the magnetic coil 17 is then de-energized. This will close the electromagnetic safety valve 8.

As shown in FIGS. 1 and 3, there is an interlock mechanism 34 that includes a lever 36 that rotates on a pivot 37 and locks the electromagnetic safety valve 8 into position by utilizing a biasing mechanism, e.g., spring, 38. The interlock mechanism 34 will remain engaged in position until the electromagnetic safety valve 8 drops-out or is disengaged, thus allowing the control valve adjustment knob 22 to rotate back to the "on" position 28 or a "pilot" position 26 after the control valve adjustment knob 22 is turned to the "off" position 24. When the control valve adjustment knob is pushed down when in the "pilot" position 26, a reset shaft 25 will depress a plunger 16 against a return biasing mechanism, e.g., spring, 14 into a position where fuel, e.g., gas, can flow into the main chamber 9.

The control valve assembly 21 also includes a return biasing mechanism, e.g., spring, 35 that provides positive positioning for the control valve adjustment knob 22. The control valve adjustment knob 22 is attached to a reset shaft 25 by a wide variety of attachment mechanisms including adhesives, welding, brazing, and mechanical hardware, however, the preferred attachment mechanism is a threaded bolt 7. It is this reset shaft 25 that either allows or prevents fuel, e.g., gas, from flowing to the pilot assembly 30. The reset shaft 25 will also function to reset the electromagnetic safety valve 8. Eccentrically projecting from the reset shaft 25 is a cam 23 that communicates the revolution of the reset shaft 25 into linear motion to turn a control valve 50 on or turn a control valve 50 off. Preferably, but not necessarily, the control valve 50 is a poppet valve. The cam 23 also provides contact with the interlock mechanism 34 to hold the lever 36 in position that is loaded by the biasing mechanism, e.g., spring, 38. There is a first o-ring 12 that prevents fuel, e.g., gas, from leaving the electromagnetic safety valve 8. Also, there is a second o-ring 13 that controls fuel, e.g., gas, flow into the pilot assembly 30 and a third o-ring 11 that prevents fuel, e.g., gas, from flowing externally from the housing 3.

As shown in FIG. 2, there is a "pilot" position 26 for the control valve adjustment knob 22 that allows fuel, e.g., gas, to flow through the energized electromagnetic safety valve 8 into the pilot assembly 30. As shown in FIG. 1, the fuel, e.g., gas, first goes past o-ring 13 into a first pilot fluid conduit 40 and then passes through a pilot filter 42 that removes contaminates from the fuel, e.g., gas. After coming out of the pilot filter 42, the fuel, e.g., gas, goes into a second pilot fluid conduit 44. From the second pilot fluid conduit 44, the fuel passes into a pilot adjustment mechanism, e.g., valve 46. The pilot adjustment mechanism, e.g., valve 46 meters the flow of fuel, e.g., gas, coming out of a pilot outlet 48. The pilot outlet 48 can provide fuel, e.g., gas, to a pilot light (not shown).

There is also an "on" position 28, as shown in FIG. 2, for the control valve adjustment knob 22 that allows fuel, e.g., gas, to flow through the energized electromagnetic safety valve 8 into the control valve 50. When the electromagnetic safety valve 8 is energized in either the "pilot" or "on" position, the electromagnetic safety valve 8 is considered "locked-up." The control valve 50, when pushed opened by the cam 23 that is on the reset shaft 25 to allow fuel, e.g., gas, to flow to an actuator valve 32 through a first fluid conduit 52. There is an actuator coil 54, which is preferably an electromagnetic coil or solenoid. When electric current is supplied to the actuator coil 54 from an electrical connector 107 located on the housing 3 through an electrical conductor (not shown) from input received from a switch or thermostat (not shown), the actuator valve 32 then opens to provide fuel, e.g., gas, from the control valve 50.

The fuel, e.g., gas, exits the actuator valve 32 from a fourth fluid conduit 109 that includes a primary bleed orifice 111 and against a pressure responsive device or diaphragm 64 for a main valve 60. This is the first side 116 or upper portion of the diaphragm 64. Moreover, the fuel, e.g., gas, exits the actuator valve 32 from a second fluid conduit 108 that includes a secondary bleed orifice 112 and against a diaphragm 64 for a main valve 60. This is the second side 114 or lower portion of the diaphragm 64. There is a balancing between the forces applied to the first side 116 versus the second side 114 of the diaphragm 64 with a need for additional pressure to be applied to the first side 116 of the diaphragm 64 to overcome the forces on the second side 114 of the diaphragm 64 as well as the pressure provided by a biasing mechanism, e.g., spring, 84 associated with the main valve 60. The primary bleed orifice 111 preferably has a larger diameter than the secondary bleed orifice 112 so the most of the fuel, e.g., gas, flows into the first side 116 of the diaphragm 64. In the same manner, much more fuel, e.g., gas, can dissipate from the first side 116 of the diaphragm 64 to quickly control operation of the main valve 60 due to the greater volume of fuel, e.g., gas, flowing out of the primary bleed orifice 111 in contrast to the volume of fuel, e.g., gas, flowing out of the secondary bleed orifice 112.

The diaphragm 64 for a main valve 60 is in contact with a first end portion 120 of a shaft 118. The second end portion 122 of the shaft 118 is attached to a valve face 124. The valve face 124 is preferably, but not necessarily, made of resilient material such as rubber. When the shaft 118 is deflected by the diaphragm 64 so that the valve face 124 is in contact with the bottom portion of the main valve 60, fuel, e.g., gas, can flow around the outside of the valve face 124 and the valve seat 126 from a fifth fluid conduit 74. The fifth fluid conduit 74 is in fluid communication to the main chamber 9 of the main control device 2 that receives fuel, e.g., gas from the inlet port 4. The fuel, e.g., gas, then flows in an outlet chamber 130 and then through the outlet port 70 via a sixth conduit 150. There is a screen 72 to block debris from entering the outlet port 70. The outlet chamber 130 is also in fluid connection to a third fluid conduit 62 that provides a sensed fuel, e.g., gas, pressure to a regulator valve 56. The main valve 60 can be attached to the main control device 2 by a wide variety of attachment mechanisms including adhesives, welding, brazing, and mechanical hardware, however, the preferred attachment mechanism is a pair of threaded bolts 132 and 133, respectively. There is a sealing mechanism, e.g., o-ring, 134 to prevent fuel, e.g., gas from leaving the main valve 60.

Figure 4:
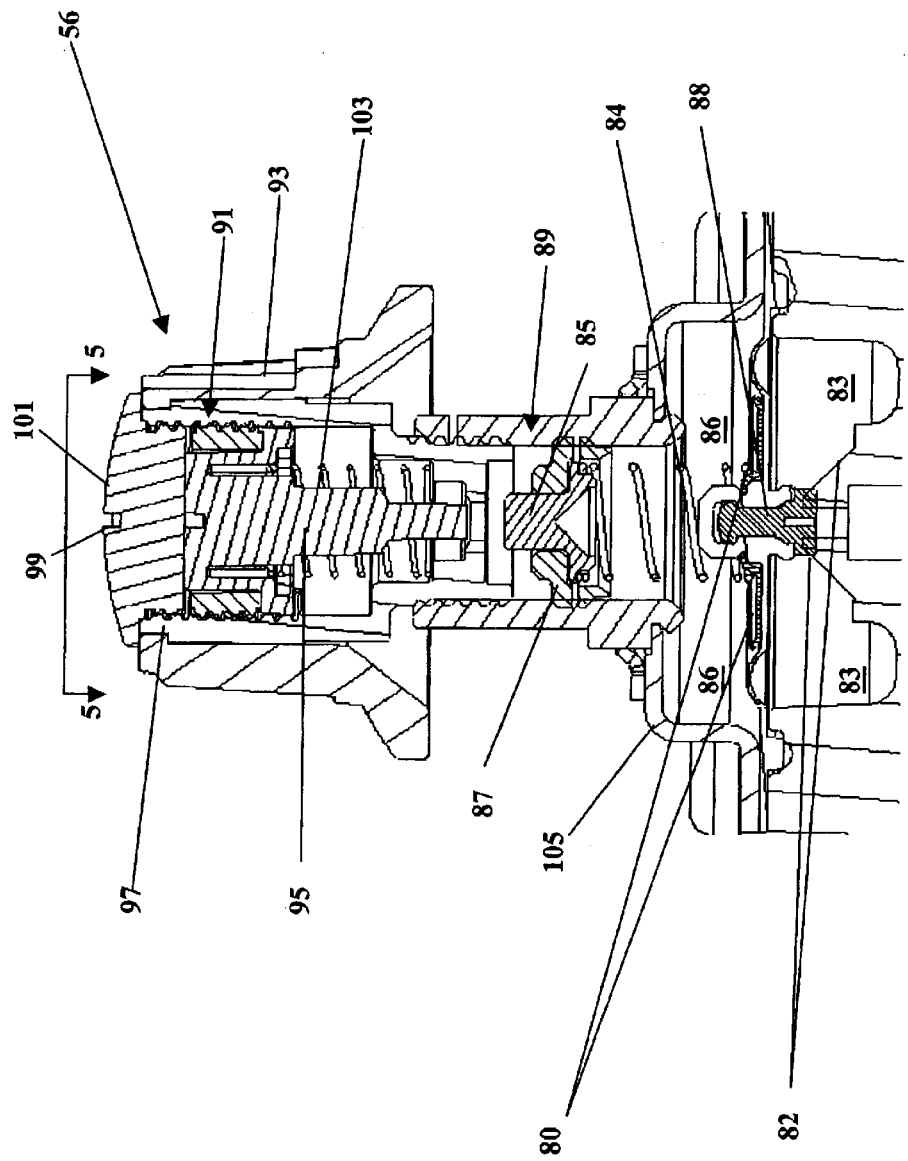
FIG. 4 is a cross-sectional view of a preferred embodiment of a pressure regulator valve, as shown in FIG. 1, that allows for convertibility between natural gas and liquefied petroleum gas, each at two different levels of pressure in accordance with the present invention.

Referring now to FIGS. 1 and 4, the regulator valve 56 controls the gas pressure applied to the diaphragm 64 for the main valve 60 by regulating the distance or gap between a regulatory valve 88 and a valve seat 82. The area between the regulatory valve diaphragm 80 and a valve seat 82 form a gas sensing port 83 that receives the fuel, e.g., gas, from the third fluid conduit 62. The regulator valve 56 is preferably defined as a servo regulator.

Referring now to FIG. 4, this distance or gap between a regulatory valve 88 and a valve seat 82 is controlled by the balanced force of a first biasing mechanism, e.g., spring, 84 against the pressure of the fuel, e.g., gas in a gas sensing port 83 against a sensing diaphragm 80. The regulatory valve 88 applies pressure on the first biasing mechanism, e.g., spring, 84 to control the amount of force that is applied. There is an upper chamber portion 86 located above the valve 88. There is a first adjustment mechanism, e.g., screw, 87 that is screwed into a first valve chamber or regulatory tower 89 and controls the vertical position of a first member or plunger 85. This first adjustment mechanism, e.g., screw, 87 controls outlet pressure of a first fuel, e.g., natural gas, so that the outlet pressure is relatively low. There is a main regulator valve body or second valve chamber 91 that is threadedly assembled into the regulatory tower 89, which can be rotated until the outlet pressure of a first fuel, e.g., natural gas, is relatively high. There is a second biasing mechanism, e.g., spring, 103 that is located within the main regulator valve body 91.

A knob 93 is assembled over the regulatory tower 89 that includes a stop (not shown) that indicates when the outlet pressure of a first fuel, e.g., natural gas, is relatively high. There is a second member or stem converter 95 that is assembled into the main regulator valve body 91.

Figure 5:
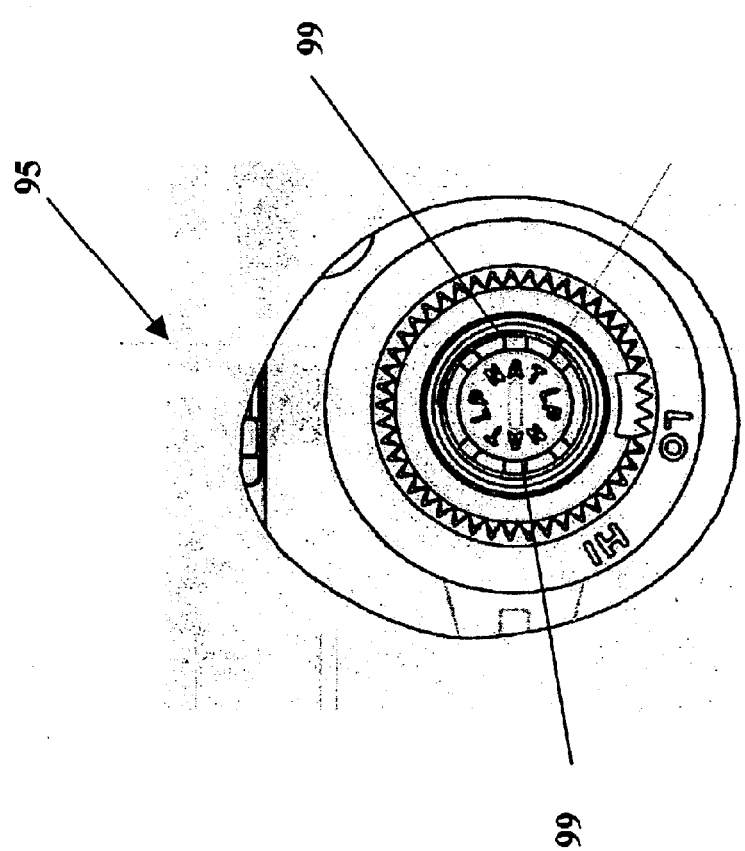
FIG. 5 is a cross-sectional view, taken along line 5—5 in FIG. 4, of the top of the knob for the pressure regulator valve that allows for convertibility between natural gas and liquefied petroleum gas each at different levels of pressure in accordance with the present invention.

Moreover, a second adjustment mechanism, e.g., screw, 97 controls outlet pressure of a second fuel, e.g., liquefied petroleum. The second adjustment mechanism, e.g., screw, 97 is assembled over the stem converter 95. The stem converter 95 can be turned to a position for utilizing the second fuel, e.g., liquefied petroleum. A tool, e.g., small screw driver, (not shown) can be utilized to turn the stem converter 95 to a position to utilize the second fuel, e.g., liquefied petroleum, by engaging notches 99, as shown in FIG. 5, on the stem converter 95. The second adjustment mechanism, e.g., screw, 97 is turned, e.g., clockwise, until the pressure for the second fuel, e.g., liquefied petroleum, is relatively high.

Referring again to FIG. 4, there is a cap 101 that is assembled into the main regulator valve body 91 to provide a seal to prevent fuel, e.g., gas, from escaping in the event that the regulatory valve diaphragm 80 ruptures. Rotation of the knob 93 can incrementally increase or decrease the amount of pressure of the fuel, e.g., gas, depending on the direction of rotation. Rotation of the knob 93 in either direction, e.g., counter-clockwise, will reduce the pressure for either fuel until the pressure is relatively low. There is a cover assembly or support member 105 that attaches the regulatory valve 56 to the housing 3 for the main control device 2. The cover assembly or support member 105 provides a holding means for the regulatory tower 89 and is shaped to prevent rotation of the regulatory tower 89 if subjected to that type of force.

The regulator valve 56 controls the amount of fuel, e.g., gas, passing into a main valve 60 through a fifth fluid conduit 74. The main valve 60 is controlled by the regulator valve 56 and the actuator valve 32 in combination. When the regulator valve 56 is operating due to the fuel, e.g., gas, flow from the third fluid conduit 62, the fifth fluid conduit 74 will deflect some of the fuel, e.g., gas, pressure from actuator valve 32 through primary bleed orifice 111. This will increase the pressure on the first side 116 of the diaphragm 64 of the main valve 60. This will move the second end portion 122 of the shaft 118, having the operatively attached valve face 124, away from the valve seat 126 to increase the fuel, e.g., gas, flow around the outside of the valve face 124 between the inlet port 4 and the outlet port 70. When the actuator valve 32 is no longer receiving fuel, e.g., gas, from the control valve 50, such as when the cam 23 turns the control valve 50 off or the electromagnetic safety valve 8 is no longer energized, then there will no longer be enough pressure on the first side 116 of the diaphragm 64 of the main valve 60. This will move the second end portion 122 of the shaft 118, having the operatively attached valve face 124, against the valve seat 126 to stop the fuel, e.g., gas, flow around the outside of the valve face 124 so that fuel, e.g., gas no longer flows between the inlet port 4 and the outlet port 70.

When the control valve 50 is closed, a significant advantage to the present invention is the ability to release fuel, e.g., gas pressure as soon as possible and not allow it to build up within the main control device 2. The pressure on first side 116 of the diaphragm 64 of the main valve 60 is allowed to bleed off through a seventh fluid line 78, having a tertiary bleed orifice 144, through the manual valve 50 through the seventh fluid line 78 as well as through the third fluid line 62 into the outlet chamber 130 and then through the outlet 70. Fuel is also quickly released from the actuator valve 32 to the second side 114 of the diaphragm 64 for the main valve 60 through the secondary bleed orifice 112 to outlet 70 to close the main valve 60.

The actuator valve 32 is closed when the electric current is no longer being supplied to the electrical connector 107 so that the actuator valve 32 closes and prevents fuel, e.g., gas, from flowing against the second side 116 of the diaphragm 64 for the main valve 60. This will force the higher pressure fuel, e.g., gas, to bleed back from the second side 116 of the diaphragm 64 for the main valve 60 through the valve seat 82 and the primary bleed orifice 111 and then through the secondary bleed orifice 112 of the second side 114 of the diaphragm 64 for the main valve 60 and then out through the outlet 70. This will cause the valve face 124 to seal against the valve seat 126 to prevent fuel, e.g., gas, from flowing out of the seventh fluid conduit 74 from the electromagnetic safety valve 8.

In addition to the previously described regulator valve 56, a number of other regulator valves may suffice. A first alternative embodiment of a regulator valve 56 is a convertible regulator valve that is generally indicated by numeral 202 in FIG. 6. The convertible regulator valve 202 controls the gas pressure applied to the diaphragm 64 for the main valve 60. This is accomplished by the convertible regulator valve 202 receiving fuel, e.g., gas, from the third fluid conduit 62 into a gas sensing port 208. The pressure from the fuel, e.g., gas, in the gas sensing port 208 pushes against a regulatory valve pressure responsive device or diaphragm 204 to create a distance or gap between a valve 207 and a valve seat 206.

The distance or gap between the valve 207 and the valve seat 206 is controlled by the balanced force of a biasing mechanism, e.g., spring, 210 against the pressure of the fuel, e.g., gas, in the gas sensing port 208 to assert a downward force on the regulatory valve diaphragm 204 to allow the convertible regulator valve 202 to operate at a predetermined set point for a desired outlet pressure.

There is a first member or plunger 212 that applies pressure on the biasing mechanism, e.g., spring, 210 to control the amount of force that is applied. There is an adjustable valve chamber 224 located above the plunger 212. There is an adjustment mechanism, e.g., screw, 214 that is threadedly connected to a first valve chamber or regulatory tower 216 and controls the vertical position of the plunger 212. The adjustment mechanism, e.g., screw, 214 controls the amount of force on the regulatory valve diaphragm 204 to obtain an outlet pressure for a desired first type of fuel, e.g., natural gas, at a first, higher pressure.

There is a main regulator valve body or second valve chamber 218 that is threadedly assembled into the regulatory tower 216, which can be rotated until the main regulator valve body 218 seals against the regulatory tower 216. The main regulator valve body 218 has a dual function. The first function is to provide a gas seal in the event that the regulatory valve diaphragm 204 would rupture. The second function is to be able to utilize a second type of fuel, e.g., liquefied petroleum.

Figure 6:
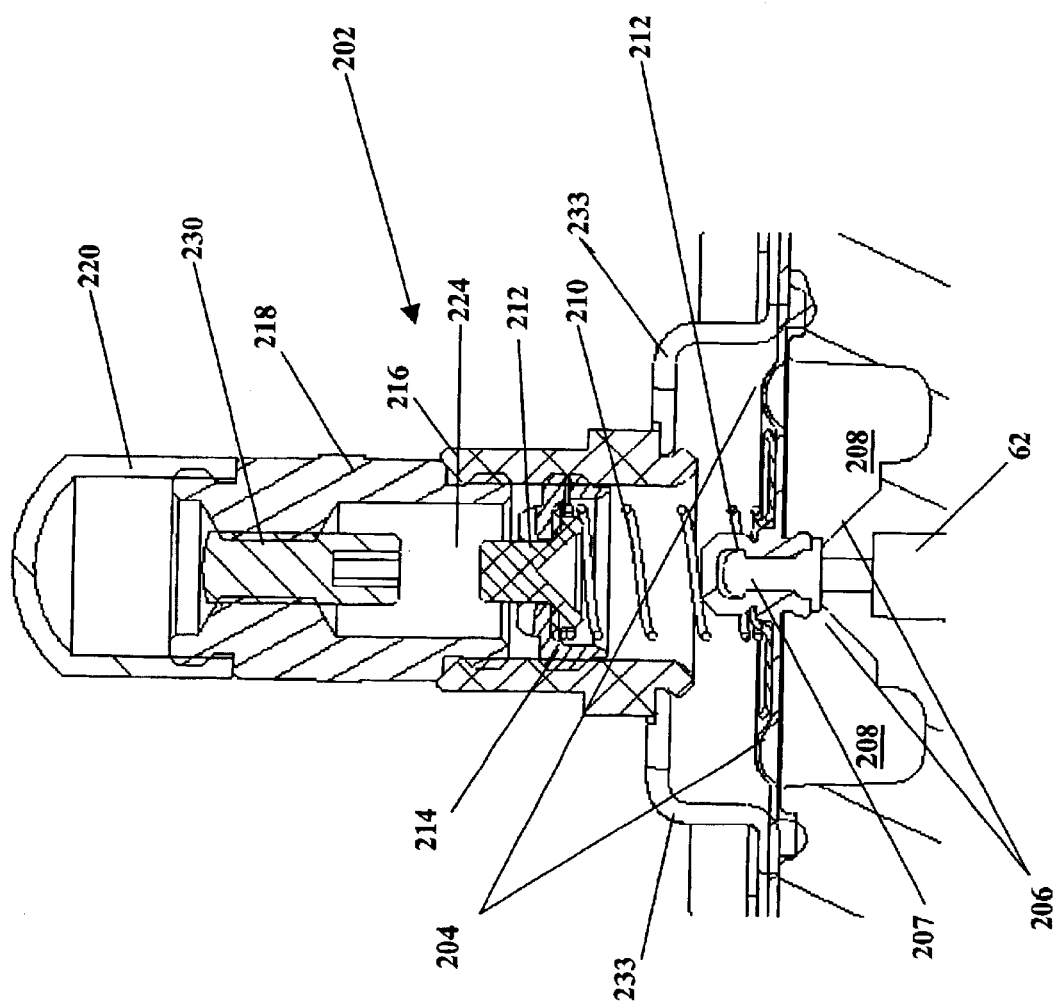
FIG. 6 is a cross-sectional view of a first alternative embodiment of a pressure regulator valve, which provides convertibility between natural gas and liquefied petroleum gas in accordance with the present invention.

As shown in FIG. 6, there is a second member or adjustment lug 230 located with the main regulator valve body 218. In the position as shown in FIG. 6, the adjustment lug 230 does not come into contact with the plunger 212 so that the height of the plunger 212 is controlled by the adjustment mechanism, e.g., screw, 214. When main regulator valve body 218 is either flipped over or rotated downward, the adjustment lug 230 can come into contact with the plunger 212 and pushes the plunger 212 downward a predetermined distance for utilizing the second type of fuel, e.g., liquefied petroleum, as a second, higher pressure. The adjustment lug 230 is threadedly connected to the main regulator valve body 218 and adjusted by rotation. When the adjustment lug 230 is rotated downward, the adjustment lug 230 comes into contact with the plunger 212 and pushes the plunger 212 downward to increase pressure on the biasing mechanism, e.g., spring, 210. This sets the convertible regulator valve 202 to a second, higher pressure for the second type of fuel, e.g., liquefied petroleum.

There is a cover assembly or support member 233 that provides a holding means for the regulatory tower 216 and is shaped to prevent rotation of the regulatory tower 216 if subjected to that type of force. There is a removable cap 220 that is assembled into the main regulator valve body 218 to protect the threads located within the main regulator valve body 218 and reduce the ease in which someone may tamper with the adjustment lug 230.

Figure 7:
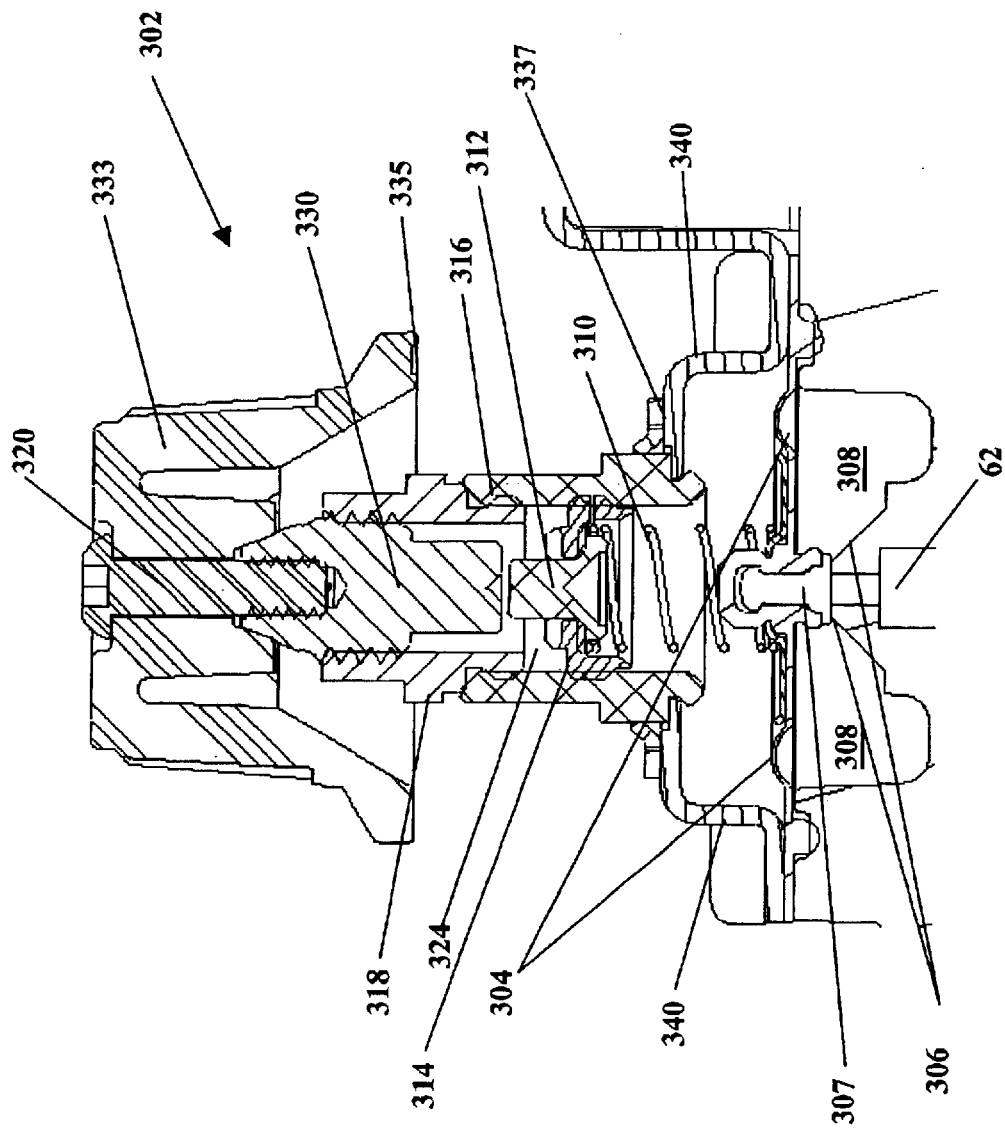
FIG. 7 is a cross-sectional view of a second alternative embodiment of a pressure regulator valve, which allows for adjustment of outlet pressure at different pressure levels with a control adjustment in accordance with the present invention.

A second alternative embodiment of a regulator valve 56 is a manual pressure modulating (Hi-Lo) valve that is generally indicated by numeral 302 in FIG. 7. The manual pressure modulating (Hi-Lo) valve 302 controls the gas pressure applied to the diaphragm 64 for the main valve 60 with control adjustment. This is accomplished by the manual pressure modulating (Hi-Lo) valve 302 receiving fuel, e.g., gas, from the third fluid conduit 62 into a gas sensing port 308. The pressure from the fuel, e.g., gas, in the gas sensing port 308 pushes against a regulatory valve diaphragm 304 to create a distance or gap between a valve 307 and a valve seat 306.

The distance or gap between the valve 307 and the valve seat 306 is controlled by the balanced force of a biasing mechanism, e.g., spring, 310 against the pressure of the fuel, e.g., gas, in the gas sensing port 308 to assert a downward force on the regulatory valve pressure responsive device or diaphragm 304 to allow the manual pressure modulating (Hi-Lo) valve 302 to operate at a predetermined set point for a desired outlet pressure.

There is a first member or plunger 312 that applies pressure on the biasing mechanism, e.g., spring, 310 to control the amount of force that is applied. There is an adjustable valve chamber 324 located above the plunger 312. There is an adjustment mechanism, e.g., screw, 314 that is threadedly connected to a first valve chamber or regulatory tower 316 and controls the vertical position of the plunger 312. The adjustment mechanism, e.g., screw, 314 controls the amount of force on the regulatory valve diaphragm 304 to obtain an outlet pressure for a desired type of fuel at a first, lower pressure.

There is a main regulator valve body or second valve chamber 318 that is threadedly assembled into the first valve chamber or regulatory tower 316. The main regulator valve body 318 has a dual function. The first function is to provide a gas seal in the event that the regulatory valve diaphragm 304 would rupture. The second function is to provide an adjustable support or assembly mechanism for a second member or selector mechanism 330.

As shown in FIG. 7, the selector mechanism 330 is threadedly connected to the main regulator valve body 318. The height of the selector mechanism 330 can be adjusted by rotating the selector mechanism 330. When rotated, the selector mechanism 330 moves downward and comes into contact with the plunger 312 and pushes the plunger 312 downward a predetermined distance for utilizing the fuel at a second, higher pressure.

There is a knob 333 that is located over the selector mechanism 330. The knob 333 includes a stop 335 for fixing a position for the second, higher pressure of fuel flow by having the stop 335 positioned against a knob locator 337. By rotating the knob 333 in the other direction will move the selector mechanism 330 upward so that the selector mechanism 330 will no longer be in contact with the plunger 312 to return the outlet pressure to the first, lower pressure with a desired type of fuel for the manual pressure modulating (Hi-Lo) valve 302.

There is a cover assembly or support member 340 that provides a holding means for the regulatory tower 316 and is shaped to prevent rotation of the regulatory tower 316 if subjected to that type of force. There is a screw 320 that is connected to the selector mechanism 330 that holds the knob 333 securely in place and prevents the knob 333 from slipping.

Figure 8:
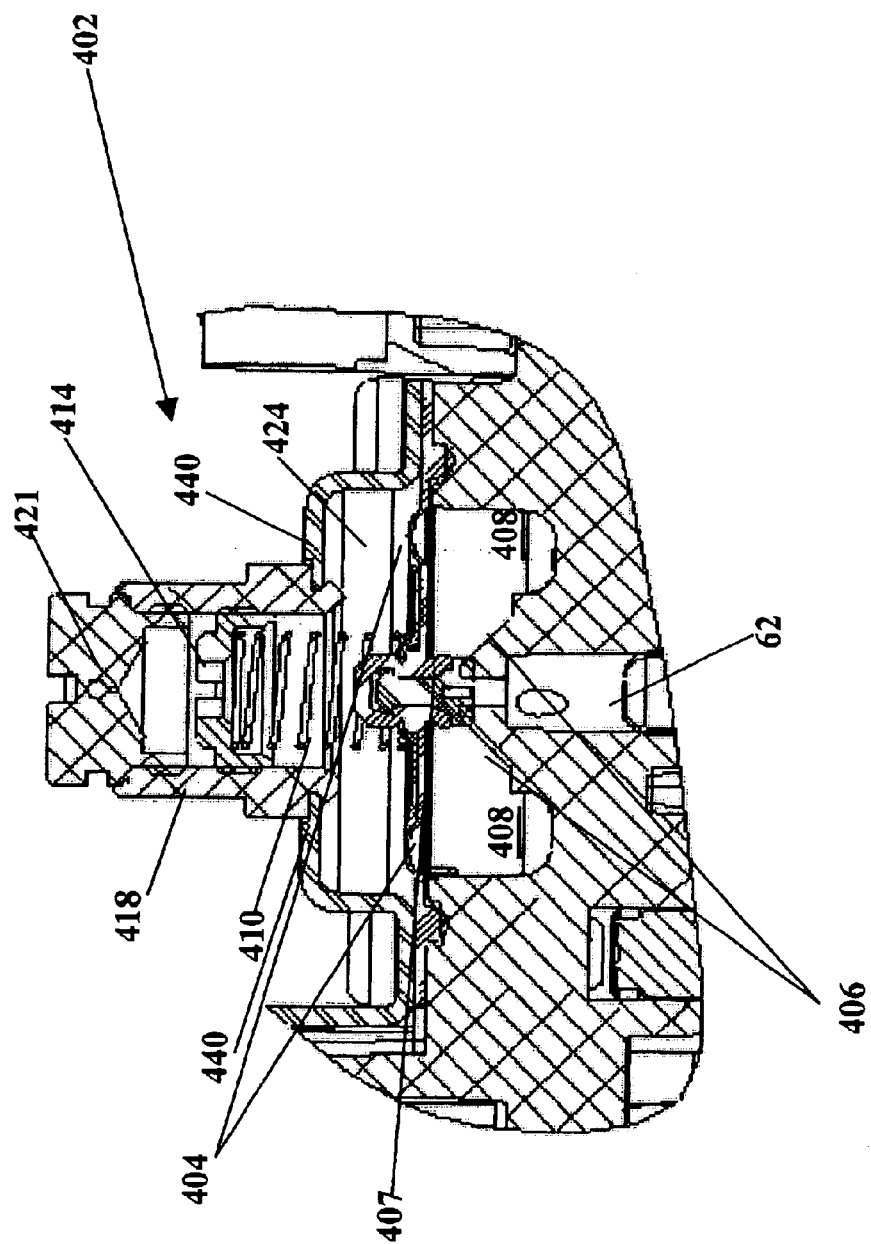
FIG. 8 is a cross-sectional view of a third alternative embodiment of a pressure regulator valve, which allows for use of either natural gas or liquefied petroleum with a fixed adjustment at the time of manufacturing in accordance with the present invention.

A third alternative embodiment of a regulator valve 56 is a fixed regulator valve that is generally indicated by numeral 402 in FIG. 8. The fixed regulator valve 402 controls the gas pressure applied to the diaphragm 64 for the main valve 60 with a fixed adjustment that is typically made at the time of manufacture. This is accomplished by the fixed regulator valve 402 receiving fuel, e.g., gas, from the third fluid conduit 62 into a gas sensing port 408. The pressure from the fuel, e.g., gas, in the gas sensing port 408 pushes against a regulatory valve pressure responsive device or diaphragm 404 to create a distance or gap between a valve 407 and a valve seat 406.

The distance or gap between the valve 407 and the valve seat 406 is controlled by the balanced force of a biasing mechanism, e.g., spring, 410 against the pressure of the fuel, e.g., gas, in the gas sensing port 408 to assert a downward force on the regulatory valve diaphragm 404 to allow the fixed regulator valve 402 to operate at a predetermined set point for a desired outlet pressure.

There is a stop 414 that applies pressure on the biasing mechanism, e.g., spring, 410 to control the amount of force that is applied. The stop 414 that is connected to a main regulator valve body or second valve chamber 418 and may be threadedly engaged for adjustment at the place of manufacture to determine whether relatively low or high pressure is desired.

There is a valve chamber 424 located above the first member or plunger 412. There is a sealed cap 421 positioned above the stop 414 that provides a dual function. The first function is to prevent someone from opening the fixed regulator valve 402 and resetting the position of the stop 414 after being initially set during manufacturing. The second function is to provide a gas seal in the event that the regulatory valve diaphragm 404 would rupture.

There is a cover assembly or support member 440 that provides a holding means for the main regulator valve body 418 and is shaped to prevent rotation of main regulator valve body 418 if subjected to that type of force.

Referring now to FIGS. 9 and 10, the outer structure of the main control device 2 is illustrated within the housing 3. In FIG. 9, which is a top perspective view of the main control device 2, the control valve adjustment knob 22 and regulator valve 56 are shown on the top portion of the housing 3 for the main control device 2. On the left hand side is the inlet port 4 and to the right is the outer cover 236 for the diaphragm 64 for the main valve 60. There are a series of screws 400 that hold the housing 3 together.

In FIG. 10, which is a bottom perspective view of the main control device 2, the right hand side shows the pilot outlet 48, a connection 10 and the outlet port 70. There is an electrical conductor, e.g., wire, support 228 that allows for a thermocouple or thermopile electrical interconnection between the connection 10 and the magnetic coil 17 of the electromagnetic safety valve 8.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A control device for regulating fluid pressure comprising:

a fluid sensing port;

a pressure responsive device adjacent to the fluid sensing port;

a valve;

a valve seat located between the valve and the pressure responsive device;

an outlet that is in fluid communication with an adjustable opening located between the valve and the valve seat;

a first valve chamber;

a second valve chamber that is moveable in relationship to the first valve chamber along a first axis and in fluid communication therewith;

a first member located within the first valve chamber;

a first biasing mechanism located between the pressure responsive device and the first member to apply pressure to the pressure responsive device that controls the pressure of fluid from the outlet;

a first adjustment mechanism adjustably attached to the first valve chamber for selectively positioning the first member in relation to the first valve chamber;

a second member located within the second valve chamber;

a second biasing mechanism to apply pressure to the second member and is located within the second valve chamber; and a second adjustment mechanism adjustably attached to the second valve chamber for selectively positioning the second member in relation to the second valve chamber.

2. The control device as set forth in claim 1, wherein the first adjustment mechanism includes a first engageable member that is threadedly interconnectable with the first valve chamber that can selectively alter a force applied to the first biasing mechanism.

3. The control device as set forth in claim 2, wherein the first engageable member can be positioned within the first valve chamber to apply pressure on the first member to allow a first fuel to flow through the outlet at a first pressure.

4. The control device as set forth in claim 3, wherein the first fuel includes natural gas.

5. The control device as set forth in claim 2, wherein the first biasing mechanism includes a first spring and the first engageable member includes a first adjustment screw.

6. The control device as set forth in claim 3, wherein the second valve chamber is positioned in relation to the first valve chamber to allow a first fuel to flow through the outlet at a second pressure that is higher than the first pressure.

7. The control device as set forth in claim 6, further includes a knob that is operatively attached to the second valve chamber so that the second valve chamber can be rotated in relation to the first valve chamber to allow relative movement of the second valve chamber in relation to the first valve chamber to selectively alter pressure of the first fuel at the outlet between the first pressure and a second pressure.

8. The control device as set forth in claim 1, wherein the second adjustment mechanism includes a second engageable member that is threadedly interconnectable with the second valve chamber that can selectively alter a force applied to the second biasing mechanism.

9. The control device as set forth in claim 8, wherein the second engageable member can be positioned within the second valve chamber to position the second member within the second valve chamber to allow a second fuel to flow through the outlet at a third pressure.

10. The control device as set forth in claim 9, wherein the second fuel includes liquefied petroleum.

11. The control device as set forth in claim 9, wherein the second biasing mechanism includes a second spring and the second engageable member includes a second adjustment screw.

12. The control device as set forth in claim 9, further includes a knob that is operatively attached to the second valve chamber so that the second valve chamber can be rotated in relation to the first valve chamber to allow relative movement of the second valve chamber in relation to the first valve chamber selectively alter pressure of the second fuel at the outlet between the third pressure and a fourth pressure.

13. The control device as set forth in claim 1, further includes a cap that is operatively attached to the second valve chamber to provide a seal to prevent fluid from leaking from the fluid control device.

14. The control device as set forth in claim 1, further includes a support frame attached to the first valve chamber.

15. The control device as set forth in claim 1, wherein the first valve chamber includes a regulatory tower, the second valve chamber includes a main valve body, the first member includes a plunger, the second member includes a stem converter, the pressure responsive device includes a diaphragm, the first biasing mechanism includes a first spring and the second biasing mechanism includes a second spring.

16. A control device for regulating fluid pressure comprising:
   a fluid sensing port;
   a diaphragm adjacent to the fluid sensing port;
   a valve;
   a valve seat located between the valve and the diaphragm;
   an outlet that is in fluid communication with an adjustable opening located between the valve and the valve seat;
   a regulatory tower;
   a main valve body that is threadedly connected to the regulatory tower and the main valve body moveable in relationship to the regulatory tower along a first axis and in fluid communication therewith;
   a plunger located within the regulatory tower;
   a first spring located between the diaphragm and the plunger to apply pressure to the diaphragm that controls the flow of fluid from the outlet;
   a first adjustment screw adjustably attached to the regulatory tower for selectively positioning the plunger in relation to the regulatory tower;
   a stem converter located within the main valve body;
   a second spring to apply pressure to the stem converter and is located within the main valve body;
   a second adjustment screw adjustably attached to the main valve body for selectively positioning the stem converter in relation to the second valve chamber; and
   a knob that is operatively attached to the main valve body so that the main valve body can be rotated in relation to the regulatory tower to allow relative movement of the main valve body in relation to the regulatory tower.

17. A method for regulating fluid pressure with a control device comprising:
   selectively positioning a first member located within a first valve chamber with a first adjustment mechanism, wherein the first member is adjacent to a first biasing mechanism;
   selectively positioning a second valve chamber in relationship to the first valve chamber; and
   selectively positioning a second member located within the second valve chamber with a second adjustment mechanism, wherein a second biasing mechanism is located between the second member and the second valve chamber, wherein the first biasing mechanism applies force to a pressure responsive device adjacent to the fluid sensing port to create an adjustable opening between a valve and a valve seat and the adjustable opening is in fluid communication with an outlet.

18. The method for regulating fluid pressure as set forth in claim 17, wherein the selectively positioning a first member located within the first valve chamber includes utilizing a first engageable member that is threadedly interconnectable with the first valve chamber to selectively alter a force applied to the first biasing mechanism to allow a first fuel to flow through the outlet at a first pressure.

19. The method for regulating fluid pressure as set forth in claim 18, wherein the first fuel includes natural gas.

20. The method for regulating fluid pressure as set forth in claim 18, wherein the first biasing mechanism includes a first spring and the first engageable member includes a first adjustment screw.

21. The method for regulating fluid pressure as set forth in claim 18, wherein the selectively positioning the first valve chamber in relationship to a second valve chamber allows a first fuel to flow through the outlet at a second pressure that is higher than the first pressure.

22. The method for regulating fluid pressure as set forth in claim 18, wherein the selectively positioning a second member located within the second valve chamber includes utilizing a second engageable member that is threadedly interconnectable with the second valve chamber to selectively alter a force applied to the second biasing mechanism to allow a second fuel to flow through the outlet at a second pressure.

23. The method for regulating fluid pressure as set forth in claim 22, wherein the second fuel includes liquefied petroleum.

24. The method for regulating fluid pressure as set forth in claim 22, wherein the second biasing mechanism includes a second spring and the second engageable member includes a second adjustment screw.

25. The method for regulating fluid pressure as set forth in claim 22, wherein the selectively altering the position of the second valve chamber in relationship to the first valve chamber allows a second fuel to flow through the outlet at a third pressure that is lower than a fourth pressure.

26. The method for regulating fluid pressure as set forth in claim 17, further includes rotating a knob that is operatively attached to the second valve chamber so that the second valve chamber can be rotated in relation to the first valve chamber to allow relative movement of the second valve chamber in relation to the first valve chamber to allow a second fuel to flow through the outlet at a fourth pressure.

27. A method for regulating fluid pressure with a control device comprising:

selectively positioning a plunger located within a regulatory tower with a first adjustment screw, wherein the plunger is adjacent to a first spring to set outlet pressure of a first fuel at a first pressure;

selectively positioning the regulatory tower in relationship to a main valve body by rotating threaded interconnections;

selectively positioning a stem converter within the main valve body with a second adjustment screw, wherein a second spring is located between the stem converter and the main valve body, wherein the first spring applies force to a diaphragm adjacent to the fluid sensing port to create an adjustable opening between a valve and a valve seat and the adjustable opening is in fluid communication with an outlet to set outlet pressure of a second fuel at a third pressure; and rotating a knob that is operatively attached to the second valve chamber so that the second valve chamber can be rotated in relation to the first valve chamber to allow relative movement of the second valve chamber in relation to the first valve chamber to selectively alter outlet pressure of the first fuel between the first pressure and a second pressure that is higher than the first pressure and outlet pressure of a second fuel between the third pressure and a fourth pressure lower than the third pressure depending on the fuel being utilized by the pressure control device.

28. The method for regulating fluid pressure as set forth in claim 27, wherein selectively positioning a stem converter includes pushing and rotating the stem converter.

* * * * *